(12) United States Patent
Li et al.

(10) Patent No.: US 8,395,628 B2
(45) Date of Patent: Mar. 12, 2013

(54) METHOD FOR ACQUIRING GRAPHICS DEVICE INTERFACE INVOCATION BY USING FILTER DRIVER

(75) Inventors: Hongwei Li, Beijing (CN); Chengkun Sun, Beijing (CN); Yiqiang Yan, Beijing (CN); Shaoping Peng, Beijing (CN); Bo Liu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 1288 days.

(21) Appl. No.: 11/776,780

(22) Filed: Jul. 12, 2007

(65) Prior Publication Data
US 2008/0012792 A1    Jan. 17, 2008

(30) Foreign Application Priority Data

Jul. 14, 2006    (CN) .......................... 2006 1 0103237

(51) Int. Cl.
*G06F 15/00*  (2006.01)
*G06F 13/14*  (2006.01)
*G06F 3/00*   (2006.01)
*G06T 1/00*   (2006.01)
*G06K 15/00*  (2006.01)

(52) U.S. Cl. ......... 345/501; 345/520; 345/522; 358/1.9; 358/1.18; 719/321; 719/323; 719/327

(58) Field of Classification Search .................. None
See application file for complete search history.

(56) References Cited

U.S. PATENT DOCUMENTS

| 7,043,697 | B1 | 5/2006 | Jensen et al. | |
| 2003/0103058 | A1* | 6/2003 | Elliott et al. | 345/589 |
| 2007/0229505 | A1* | 10/2007 | Souza et al. | 345/441 |

FOREIGN PATENT DOCUMENTS

CN    1746839 A    3/2006

OTHER PUBLICATIONS

P. Blenkhorn, D.G. Evans, A. Baude, Full-screen magnification for windows using DirectX overlays, Neural Systems and Rehabilitation Engineering, IEEE Transactions, vol. 10, Dec. 2002, pp. 225-231.*

* cited by examiner

*Primary Examiner* — Tize Ma
(74) *Attorney, Agent, or Firm* — Dickstein Shapiro LLP

(57) ABSTRACT

A method for intercepting graphics device interface invocations by using filter driver which is transparent to graphics device interface engine and real display driver is disclosed. The method comprises steps of duplicating DDI function table returned from said real display driver, modifying DDI functions of said real display driver required for capturing screen update, creating auxiliary buffer area as updating buffer area for said screen update, and further processing said updating buffer area. With the method of the present invention, the support to video and 3D acceleration in the local computer can be realized by means of software, and the user can be provided with high-quality picture and display effect. Compared with the Mirror system in the prior art, since the present invention doesn't employ the Mirror system, the graphics device interface engine of the inventive system are not aware of the existence of the filter driver, the video and 3D acceleration function of the graphic card still remains. As a result, the function can be supported in the system, and applications employing video and 3D acceleration can be executed normally.

4 Claims, 3 Drawing Sheets

| SUPPORTED DDI NO. | POINTER TO FUNCTION |
|---|---|
| INDEX_DrvEnablePDEV | DrvEnablePDEV |
| INDEX_DrvCompletePDEV | DrvEnablePDEV |
| INDEX_DrvDisablePDEV | DrvEnablePDEV |
| INDEX_DrvEnableSurface | DrvEnablePDEV |
| INDEX_DrvDisableSurface | DrvEnablePDEV |
| INDEX_DrvDisableDriver | DrvDisableDriver |

(DRIVER MANAGEMENT DDIs)

| SUPPORTED DDI NO. | POINTER TO FUNCTION |
|---|---|
| INDEX_DrvEscape | DrvEscape |
| INDEX_DrvTextOut | DrvTextOut |
| INDEX_DrvBitBlt | DrvBitBlt |
| INDEX_DrvCopyBits | DrvCopyBits |
| INDEX_DrvStrokePath | DrvStrokePath |
| INDEX_DrvStretchBlt | DrvStretchBlt |
| INDEX_DrvStretchBltROP | DrvStretchBltROP |
| INDEX_DrvPlgBlt | DrvPlgBlt |
| INDEX_DrvGradientFill | DrvGradientFill |
| INDEX_DrvAlphaBlend | DrvAlphaBlend |
| INDEX_DrvTransparentBlt | DrvTransparentBlt |
| INDEX_DrvFillPath | DrvFillPath |
| INDEX_DrvLineTo | DrvLineTo |
| INDEX_DrvSetPalette | DrvSetPalette |

(DRAWING DDIs)

| SUPPORTED DDI NO. | POINTER TO FUNCTION |
|---|---|
| INDEX_DrvSetPointerShape | DrvSetPointerShape |
| INDEX_DrvMovePointer | DrvMovePointer |

(MOUSE CONTROL)

FIG. 3

METHOD FOR ACQUIRING GRAPHICS DEVICE INTERFACE INVOCATION BY USING FILTER DRIVER

BACKGROUND OF THE INVENTION

1. Field of Invention

The present invention relates to the field of computer graphics and image processing, and particularly to a method for acquiring graphic data of a display device in a computer by means of filter driver.

2. Description of Prior Art

The graphics and image processing capability of a personal computer (PC) is gradually strengthen with its enhanced computation performance and installed graphics processor and is extended from earlier 2D bitmap and vector application to 3D and video. Rich content brings a user more enjoyable experience, while applications for synchronously obtaining content to be displayed are required, especially the application for realizing a real-time acquisition of screen content, since great challenges are imposed by remote control, remote projection, multi-user sharing, static screen capture and the like.

There are both software and hardware implementations with respect to techniques for a real-time acquisition of screen content. The technique for acquiring screen content in a real-time manner by means of hardware is to intercept directly video output signal from a display adapter, input it into a video compression card as input source, and record it in the form of stream after the compression by the compression card. This hardware solution is simple since a hardware compression card is utilized to process video signal and thus there is no extra requirement in terms of a computer's processing ability. This solution, however, has disadvantages that a video compression card must be added and device configuration is complicated, which leads to inconvenience in a user's manipulation. Moreover, in the hardware solution, a signal has to undergo digital-to-analog conversion twice and thus suffers from certain accuracy decline and great distortion, and therefore the user can not be provided with a high-quality picture.

The following is a brief introduction to the technique for acquiring screen content in a real-time manner by means of software. In the operation system Windows, an application fulfills graphic drawing through GDI (Graphics Device Interface) which supports graphic primitive operation and dot matrix interface. A primitive-level interface is relatively advanced and requires a small amount of description data, while it cannot be displayed directly and needs to be converted into dot matrix for output by cooperation of Windows display system and graphic card. A dot matrix-level interface is relatively low and requires a large amount of data, while the data captured by it can be displayed directly. Therefore, in a software solution, the capture of graphic data can be carried out at a dot matrix level, a primitive invoking level or through their combination.

The first software solution is to utilize a user-mode application to acquire FrameBuffer (Frame Buffer), and then postprocess the acquired frame image. The second software solution is to utilize a Mirror system for displaying defined by Microsoft company, load a mirror display driver (mirror), duplicate each update for current display screen in a real-time manner, and then compress the mirrored data for recording in stream.

In the first software solution, each time the entire screen is acquired whether there is update or not. In addition, the solution can utilize only a dot matrix interface, and thus it is characterized by large data quantity, slow operation, high bandwidth requirement and suitable for capturing single static screen. In the second software solution, since only the changed part of the screen is acquired, image data is obtained at a faster speed and can be duplicated simultaneously with image displaying (with higher real-time capability), and the second software solution is thus widely applied. Unfortunately, since the source data for video and 3D processing are of a large quantity, require complex local computation and usually undergo accelerated processing by a GPU (Graphics Processing Unit) in a graphic card, the support to video and 3D acceleration in a local computer is automatically prohibited when the Mirror system is defined by Microsoft company, which disables the execution of applications depending on video and 3D acceleration and affects significantly the execution effect of applications employing Mirror.

Accordingly, it is necessary to find a Mirror-like method for rapidly intercepting GDI invocations and supporting video and 3D acceleration simultaneously.

SUMMARY OF THE INVENTION

In view of the above problems, the present invention is done. The object of the present invention is to provide a method for acquiring graphics device interface invocations by using graphic filter driver in order to support video and 3D acceleration in a local computer simultaneously.

According to one aspect of the present invention, a method for intercepting graphics device interface invocation by using filter driver which is transparent to graphics device interface engine and real display driver, the method comprises steps of duplicating Device Driver Interface (DDI) function table returned from the real display driver, modifying DDI functions of the real display driver required for capturing screen update, creating auxiliary buffer area as updating buffer area for the screen update, and further processing the updating buffer area.

With the acquiring method of the present invention, the support to video and 3D acceleration in the local computer can be retained, and the user can still access to high-quality picture and hardware accelerated display effect. Compared with the Mirror system in the prior art, since the present invention doesn't employ the Mirror system, the graphics device interface engine of the inventive system are not aware of the existence of the filter driver, the video and 3D acceleration function of the graphic card still remains. As a result, the video and 3D function can still be supported in the system, and applications employing video and 3D acceleration can be executed normally.

BRIEF DESCRIPTION OF THE DRAWINGS

FIG. 3 shows DDI list of interface names necessary to be duplicated and processed in the procedure of loading graphic filter driver.

DETAILED DESCRIPTION OF THE PREFERRED EMBODIMENTS

Figure 1:
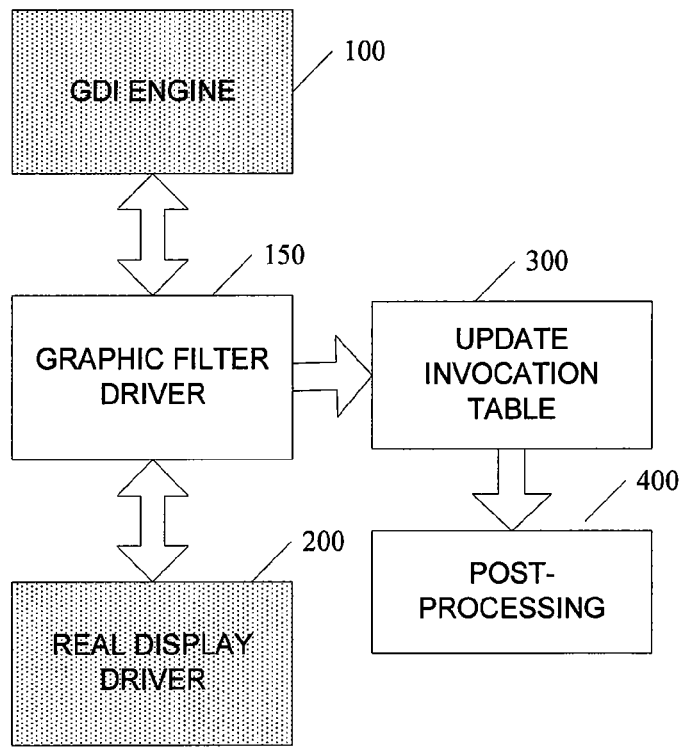
FIG. 1 shows logical relationship between graphic filter driver and GDI engine and real display driver utilized in the method according to an embodiment of the present invention.

Hereafter, the specific embodiments of the present invention will be explained in detail with reference to the drawing.

In the following explanation, technological details known in the art will be omitted since a wordily description for these well-known techniques will obscure some features and advantages of the present invention.

In the operation system Windows, a display driver is required to support a series of graphics device driver interfaces DDIs which can be classified roughly into device object for driver management, Surface, mouse, device bitmap, DirectX and drawing DDI. As long as it realizes DDI interface, a piece of program can be loaded as a display driver.

FIG. 1 shows logical relationship between graphic filter driver 150 and GDI engine 100 and real display driver 200 utilized in the method according to an embodiment of the present invention.

As shown in FIG. 1, the present invention is provided additionally with a filter layer referred to as graphic filter driver 150 between the GDI engine 100 and the real display driver 200. By installing the graphic filter driver 150 and initializing the system, the filter layer appears as the real display driver 200 with respect to the Windows GDI engine 100, while it appears as the Windows GDI engine 100 with respect to the real display driver 200. In other words, the graphic filter driver 150 here is transparent to the GDI engine 100 and the real display driver 200.

For the drawing DDI corresponding to each display update, the DDI of the graphic filter driver 150 is invoked first of all. During the execution, the corresponding DDI of the real display driver is first invoked to fulfill local display update, and then the invoked parameter is saved in an invocation update table 300 or transformed into dot matrix by invoking the GDI engine 100. At the same time each of changed regions in the displayed picture is recorded.

Figure 2:
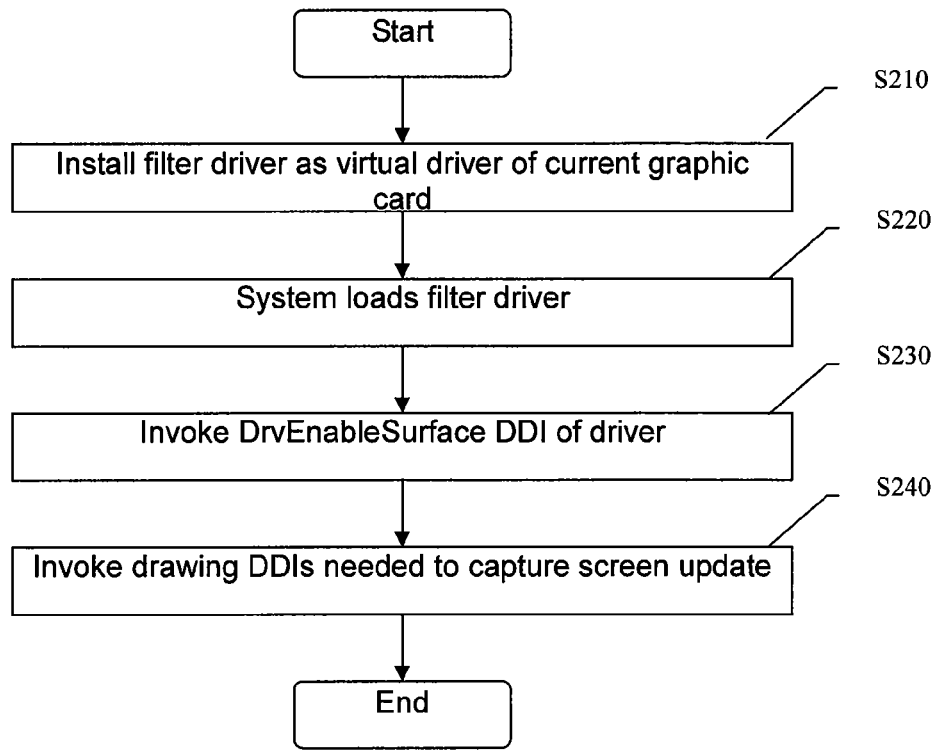
FIG. 2 is a flowchart for explaining the method according to the embodiment of the present invention.

FIG. 2 is a flowchart for explaining the method according to the embodiment of the present invention. As shown in FIG. 2, at the step S210, the above graphic filter driver 150 is installed as the virtual driver of the current graphic card.

During the installation, a program for installing acquires PND DeviceID (i.e. Plug-and-Display Device Identification) of main display device of the current system, enumerates and matches the DeviceID of each registration item under the graphic card registration item {4d36e968-e325-11 ce-bfc1-08002be10318}. The registration item InstalledDisplayDrivers under the setting key Settings is modified for each matched registration item, and the value of the Key is modified to the name of the graphic filter driver 150 in the present invention.

At the step S220, the operation system obtains the module name of the display driver by means of the name of the graphic filter driver and loads it into the system. Thus, the graphic filter driver 150 is loaded into the system.

In the procedure of loading the graphic filter driver into the system, with a driver entry function DrvEnableDriver, the graphic filter driver 150 loads the real display driver 200 and duplicates the DDI function table returned by the real display driver 200. For each DDI function needed to capture screen update, its value in the function table is modified to a pointer pointing at a corresponding function of the filter driver, while the original function pointer is saved. For those functions requiring no processing, such as video and 3D acceleration interface, the function pointers of the real display driver are still maintained, and a duplicated function table is returned to GDI. In this way, the graphic filter driver 150 fulfills its filter function in the procedure of invoking the real display driver 200.

FIG. 3 shows DDI list of interface names necessary to be duplicated and processed in the procedure of loading graphic filter driver.

The graphic filter driver 150 is required to implement all the driver management DDIs among those interface DDIs in the DDI list so as to intercept GDI-required functions, for example driver loading, driver prohibiting and the like, create interior management data and forward the invocations to the corresponding functions of the real driver.

Furthermore, emphasis of the interception is placed on drawing DDIs through which all the screen update can be realized. The graphic filter driver 150 records updating DDI parameters and updated source data, saves them in the update invocation table 300, and invokes the corresponding DDI of the real display driver to complete the local drawing. If necessary, the graphic filter driver 150 can convert the invocation of the updating DDI into dot matrix and save it in an updating frame buffer.

Further, a mouse/cursor control DDI updates the position and shape of the mouse/cursor, and the relevant information is recorded by the graphic filter driver 150 for post-processing 400.

At the step S230, the DrvEnableSurface DDI of the graphic filter driver 150 is invoked and responsible for creating a main Surface in which the output results of all subsequent drawing DDIs are saved. If the filter driver is intended to save updating buffer, the graphic filter driver 150 creates an auxiliary Surface as the updating buffer for captured screen update. When subsequent drawing DDIs are invoked, their drawing dot matrix are saved in this auxiliary Surface.

At the step S240, the drawing DDIs needed to capture screen update are invoked. The graphic filter driver 150 saves the invocation parameters and updated data source in the update invocation table 300, invokes the DDI of the real driver through the saved original function pointer to complete the display update for the real graphic card. If the frame buffer is to be saved, the graphic filter driver 150 completes the drawing on the auxiliary Surface by itself or with help of the GDI engine 100. In this way, the content in the auxiliary buffer area is updated synchronously with the display screen.

Figure 4:
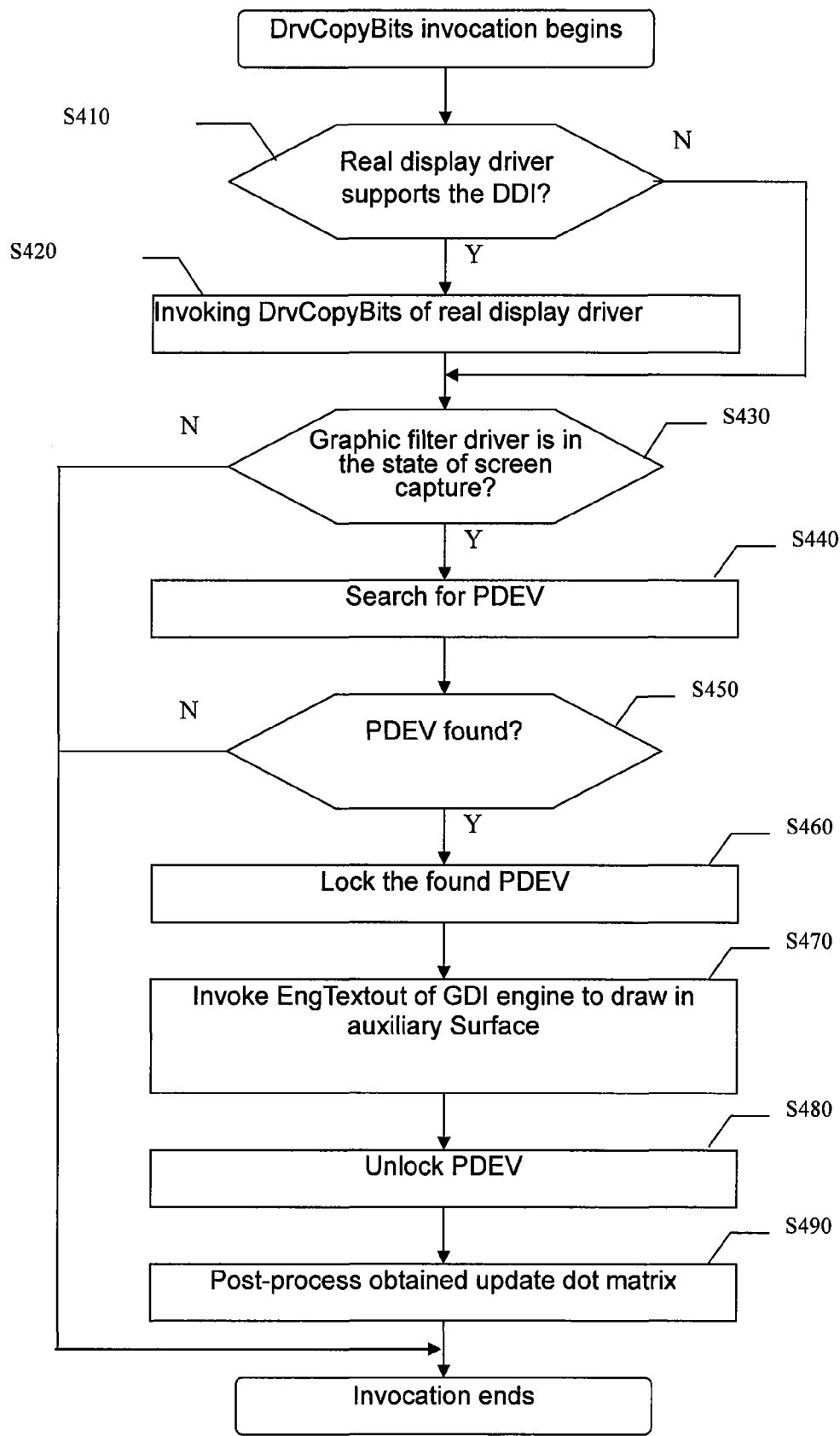
FIG. 4 shows a processing flow for the steps in the above method by example of TextOut for recording update dot matrix.

FIG. 4 shows a processing flow for the step S240 in the above method by example of TextOut for recording update dot matrix.

As shown in FIG. 4, at the step S410, the system judges first whether the real display driver 200 supports the DDI. If it is the case, the function of the real display driver 200 is invoked at the step S420 to update the local display, otherwise the local update is skipped.

Then, at the step S430, the system judges whether the graphic filter driver 150 is in operating state, and if no operation, the flow is ended. On the other hand, if the graphic filter driver is in the state of screen capture, the structure of the filter driver created in the phase of DrvEnablePDEV is searched at the step S440, and it is determined whether the structure has been found at the step S450. If the result is positive, it means that the structure is actually created by the filter driver, and then the auxiliary Surface is locked at the step S460. Thereafter, the dot matrix is drawn into the auxiliary Surface at the step S470, and the auxiliary Surface is unlocked at the step S480. Finally, the obtained dot matrix is post-processed at the step S490.

The inventive method for capturing GDI data by using filter driver can be applied to a wireless projection solution supporting video and 3D application. In this solution, the intercepted drawing DDIs fulfill drawing tasks by invoking corresponding functions of GDI engine, and the dot matrix saved in the updating buffer area is subjected to compression coding by another module and transferred to the remote end of a projector via network. Alternatively, the intercepted drawing primitives are distinguished, and compression is made to the dot matrix data of DDIs related to dot matrix operation, while non-dot matrix data process directly the drawing primitive in the updating buffer. The data of the two types are transferred together to the projector end for decompression and primitive drawing in order to duplicate the picture at the host end.

The above description is only the specific implementation of the present invention, and the scope of the invention is not limited thereto. The scope of invention is intended to cover all modifications and substitutions readily conceivable by should those skilled in the art and thus should be defined in the appended claims.

What is claimed is:

1. A method for intercepting graphics device interface invocations, said method comprises steps of:
    duplicating a Device driver Interface (DDI) function table returned from a real display driver,
    modifying the value of each of said DDI functions required for capturing screen update in said function table to a pointer pointing a corresponding function of a filter driver provided between said real display driver and a graphics device interface engine, and saving simultaneously the original function pointer,
    creating auxiliary buffer area as updating buffer area for the captured screen update, and
    post-processing said updating buffer area;
    wherein said filter driver is transparent to said real display driver and said graphics device interface engine such that said filter driver appears as said real display driver with respect to said graphics device interface engine, while appearing as said graphics device interface engine with respect to said real display driver.

2. The method according to claim 1, further comprising:
    invoking the corresponding drawing DDI of said real display driver to realize local display update.

3. The method according to claim 2, wherein said step of invoking the corresponding drawing DDI of the real display driver to realize local display update comprises:
    invoking the drawing DDI of said real display driver via the saved original function pointer to realize display update for a real graphic card.

4. The method according to claim 1, wherein said step of post-processing said updating buffer area comprises:
    drawing said updating buffer area into dot matrix as required or processing directly the intercepted primitive.

* * * * *